United States Patent

[11] 3,625,475

[72] Inventors William T. Stephens;
Ralph R. Ohnesorge, both of c/o Gresen Manufacturing Co., P.O. Box 1313, Minneapolis, Minn. 55440
[21] Appl. No. 36,226
[22] Filed May 11, 1970
[45] Patented Dec. 7, 1971
Continuation-in-part of application Ser. No. 885,078, Dec. 15, 1969, now abandoned. This application May 11, 1970, Ser. No. 36,226

[54] VALVE DETENT APPARATUS
22 Claims, 14 Drawing Figs.
[52] U.S. Cl.................................................... 251/111, 74/527, 85/5
[51] Int. Cl. ............................................... F16k 35/02
[50] Field of Search.......................................... 251/111, 113, 67, 68, 69, 71; 285/316, 277; 137/383; 24/211 A; 74/527; 85/5 B

[56] References Cited
UNITED STATES PATENTS

| | | | |
|---|---|---|---|
| 2,402,925 | 6/1946 | Spooner ...................... | 85/5 |
| 3,046,827 | 7/1962 | Myers......................... | 85/5 |
| 3,089,507 | 5/1963 | Drake et al. ................. | 137/383 |
| 3,153,949 | 10/1964 | Rice ............................ | 74/527 |
| 3,218,882 | 11/1965 | Stephens et al............... | 74/527 |

FOREIGN PATENTS

| | | | |
|---|---|---|---|
| 439,602 | 12/1935 | Great Britain................ | 251/68 |

Primary Examiner—Henry T. Klinksiek
Attorney—Carlsen, Carlsen & Sturm

ABSTRACT: An improved detent mechanism for a hydraulic valve of the spool type. An extension of a valve spool includes a cage for axially displacing a plurality of ball members that are radially movable in a like plurality of apertures in the cage. A detenting member having a cylindrical body portion at one end and an enlarged, axially grooved cylindrical portion having an inclined ramp facing the cylindrically shaped portion and the valve spool is rotatably and reciprocably mounted with respect to the valve body. The detenting member is biased toward the valve spool and an inclined shoulder facing axially outwardly of the valve spool is provided radially outwardly of the normal position of the enlarged end of the detenting member. As the spool is moved toward the detenting member, the apertures are in radial registration with the enlarged cylindrical end portion of the detenting member. Engagement of the ball members with the ramp portions moves the detenting member axially to allow the ball members to move radially outwardly into detenting engagement with the shoulder. The detenting engagement is released upon rotation of the detenting member so that the ball members may fall into the grooves in the enlarged end of the detenting member and allow the spool member to return to its normal axial position.

3,625,475

PATENTED DEC 7 1971

INVENTOR.
WILLIAM T. STEPHENS
BY RALPH R. OHNESORGE

Carlsen Carlsen & Sturm
ATTORNEYS

INVENTOR.
WILLIAM T. STEPHENS
BY RALPH R. OHNESORGE

Carlsen Carlsen & Sturm

ATTORNEYS

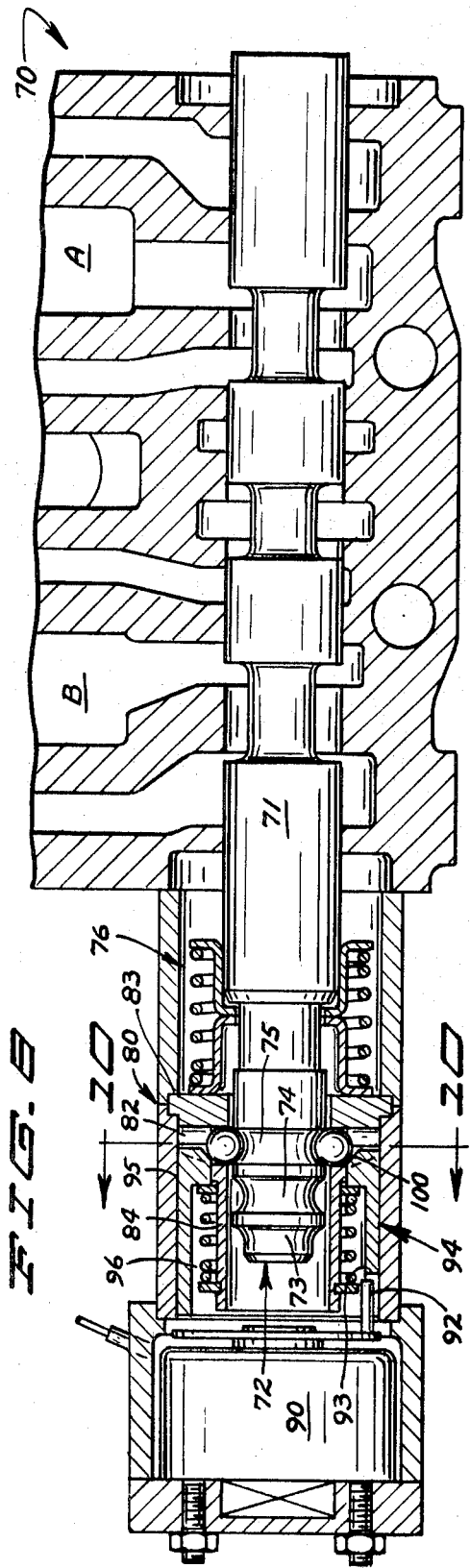
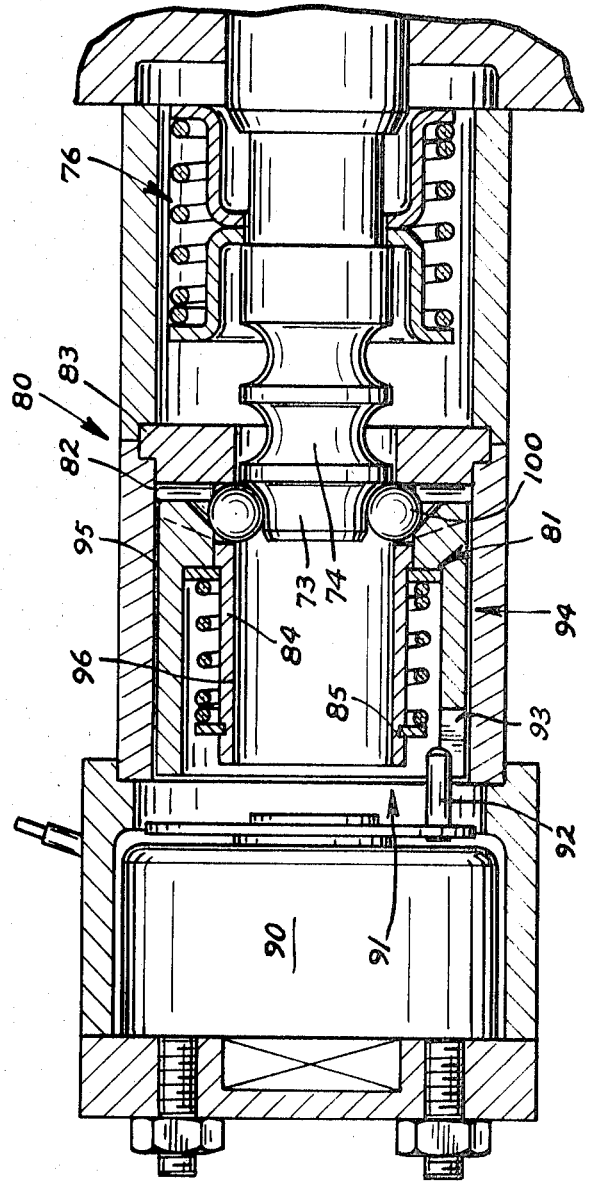

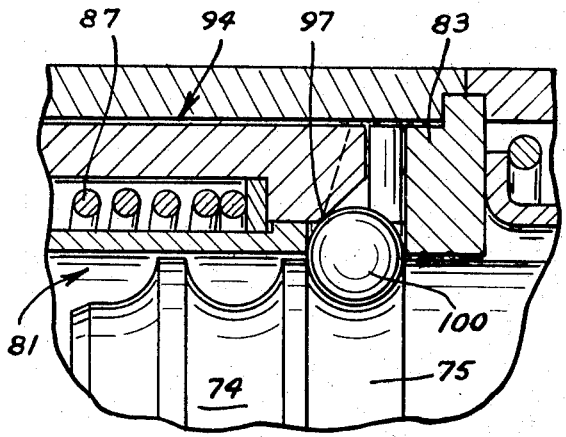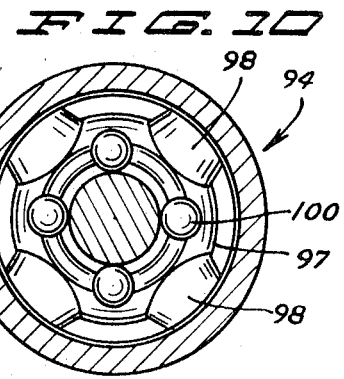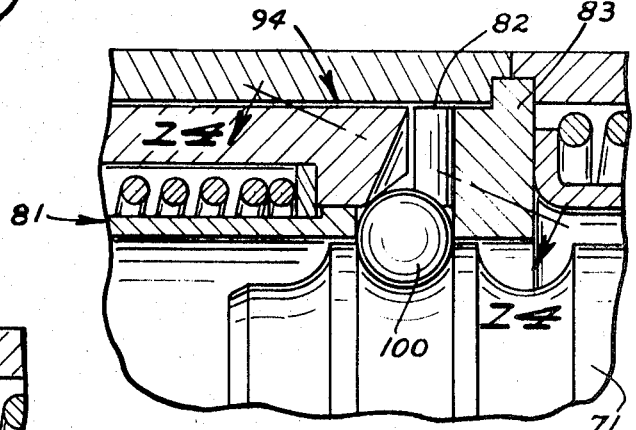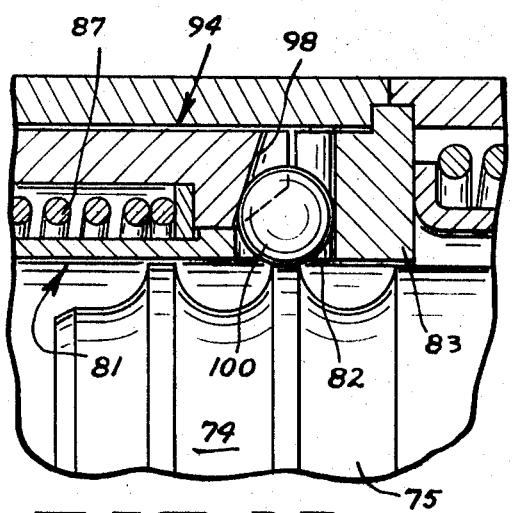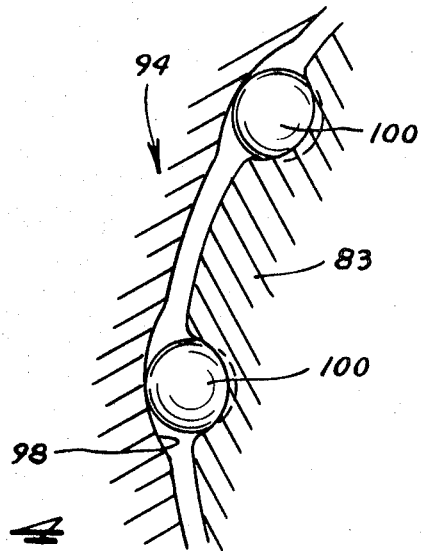

VALVE DETENT APPARATUS

This is a continuation-in-part of an earlier filed application in the names of William T. Stephens and Ralph R. Ohnesorge, Ser. No. 885,078, filed Dec. 15, 1969, now abandoned, for Valve Detent Apparatus.

This invention is directed to apparatus for controlling the operation of hydraulic valves and is more particularly directed to apparatus for releasably holding a hydraulic valve operator in an actuated position subject to return to a normal, or inoperative position upon the occurrence of a predetermined event. For example, the spool of a hydraulic valve may be moved to a position which will cause actuation of a control device which is to be stopped at a predetermined limit of operation. Means are provided for engaging and holding the valve in the actuated position subject to the energization of a release mechanism upon the occurrence of the activated device reaching such predetermined limit of operation. Under certain conditions, the signal for deenergizing or releasing the valve from its actuated position may be applied a predetermined time or distance prior to the actuated device reaching the predetermined limit to thereby allow for inertia in the system and to prevent premature failing of the components of the system due to the existence of undesirable transient forces which might otherwise have been imposed on the system.

It is therefore an object of our invention to provide an improved detent apparatus for a hydraulic valve.

Another object of our invention is to provide an improved detent apparatus for a hydraulic valve which may be operative under a greater latitude of predetermined conditions of operation.

A still further object of our invention is to provide detenting apparatus for a hydraulic valve which provides greater efficiency of operation than heretobefore obtained.

Another object of our invention is to provide improved detenting and releasable locking apparatus for a hydraulic valve which attains greater efficiency of operation by reducing the power requirements therefor.

These and other objects and advantages of our invention may become apparent from a consideration of the appended specification, claims and drawings, in which:

FIG. 1 is an end view, on a reduced scale, of a hydraulic valve to which the principles of our invention have been applied;

FIG. 2 is an enlarged partially sectional and skeletonized view of the apparatus shown in FIG. 1 taken along section line 2—2;

FIG. 8 is a fragmentary sectional view of a further embodiment of our invention;

FIG. 9 is an enlarged fragmentary sectional view of a portion of FIG. 8 showing the valve spool in a second detented position;

FIG. 10 is a sectional view of the apparatus shown in FIG. 8 taken along Section line 10—10 on FIG. 8;

FIG. 11 is an enlarged fragmentary sectional view of a portion of FIG. 8;

FIG. 12 is an enlarged sectional view of a portion of FIG. 8 showing the operation of the apparatus contained therein;

FIG. 13 is likewise an enlarged fragmentary sectional view of a portion of FIG. 8 showing the relationship of the elements in one of the stages of operation of the apparatus shown in FIG. 8;

FIG. 14 is a fragmentary sectional view taken along section line 14—14 on FIG. 12 illustrating the relative dimensions and configurations of the elements illustrated on FIGS. 8 and 12.

Figure 3:
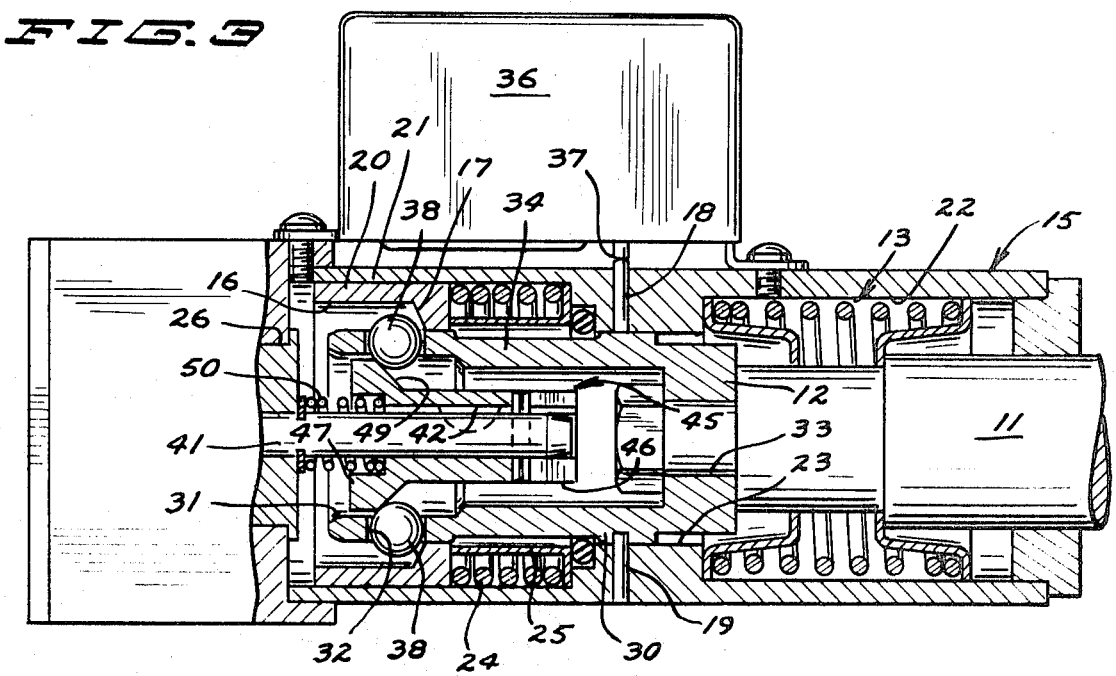
FIG. 3 is an enlarged partial sectional view of the apparatus shown in FIG. 2 at a predetermined stage of operation.

Referring now to the figures of the drawing, it may be seen that our invention has been applied to one of many well-known forms of hydraulic valve mechanisms in which a valve body 10 may be provided with a suitable predetermined pattern of ports to be connected to fluid under pressure, to fluid utilization devices and to fluid reservoirs (all not shown) through the operation of a slidably disposed valve spool 11 that is reciprocably disposed in a suitable bore, therefore, in valve body 10. Since our invention is concerned primarily with apparatus for engaging valve spool 11 in an operative position and releasing such valve spool 11 so that it may return to an inoperative, or other position, all of the details concerning the functions which may be provided by a valve spool of the general class have been omitted for the sake of clarity but it is clearly understood that such functions may be those desired by those skilled in the art or may be readily ascertained by others skilled in the art to which our invention pertains. Valve spool 11 may be operated under a number of conditions, including manual or motor-driven, or others, as, again, dictated by the requirements of a particular installation or the desires of the operators or designers of the systems into which hydraulic valves may be introduced.

In summary, there is shown in the drawings, a valve body 10 having a bore through which a valve spool 11 is reciprocably disposed and valve spool 11 is shown having an outer end 12 which is operatively associated with a common and well-known form of centering-spring arrangement which is indicated generally by reference character 13.

At the left end of valve body 10 a hollow housing 15 is disposed over the outer end of valve spool 11. Housing 15 includes an enlarged outer end 21, an enlarged inner end 22 between which is disposed a center shoulder portion 23. An outer shoulder portion 26 is disposed over the outer end of hollow housing 15 and contains apparatus which will be described in greater detail below. At the outer end of hollow housing 15, a slidable, cylindrical collar 20 is shown as having an enlarged outer end 16 with an inclined inwardly opening portion 17 at its end closer to valve body 10. A biasing spring 24 and biasing spring collar 25 are shown disposed intermediate center shoulder 23 and the inner end of slidable collar 20 to tend to bias slidable collar 20 in an outward direction with respect to valve body 10.

A cage member 30 having an open end 31 and a plurality of radial apertures 32 extending therethrough is shown fastened to the outer end of spool 11 through suitable fastening means, shown in the form of a bolt 33. Cage 30 is shown provided with a necked-down center portion 34 on its central outer periphery for coaction with a switch pin 18 shown reciprocably disposed in a suitable aperture therefor through center shoulder 23 of hollow housing 15 for coaction with an actuator 37 on a suitable switch means 36. Each of the apertures 32 in cage 30 is preferably provided with a suitable ball member 38 which may be radially reciprocably operable therethrough for purposes to be explained below and within the limits determined by the elements with which they may coact. Switch 36 may be, for example, a common form of miniature snap-acting switch and is preferably, for the illustrative embodiment, a normally open switch that is closed upon actuation, upwardly, of pin 18 in response to displacement thereof through engagement with the radially enlarged portions of cage 30 adjacent the axial ends of center necked-down portion 34.

A rotary solenoid motor 40 is shown suitably disposed upon shoulder 26 (which may be part of a housing suitably appended to the outer end of housing 15). Rotary solenoid 40 may be one of many forms familiar to those skilled in the art and readily available on the commercial market. Such common forms of rotary solenoids may include an axially extending shaft member 41 which may be suitably adapted to receive and hold a key member 42 and a lockpin member 52 by the provision of suitable cavities or apertures therein.

Most common forms of rotary solenoids are adapted to rotate of step the shafts or outputs associated therewith for a predetermined rotary distance and may or may not be provided with internal stop members or other devices for determining the angular degree of rotation in accordance with energization thereof from a suitable source of electrical current. It may be noted that shaft 41 of rotary solenoid 40 is disposed substantially coaxially of valve spool member 11 and therefore substantially coaxially of cage member 30. It may also be noted that shaft 41 preferably extends axially inwardly of the open end 31 of cage member 30.

A hollow detent member 45 is shown axially slidably and nonrotatably connected to rotary solenoid shaft 41 and is likewise disposed to extend for a considerable distance into the hollow end 31 of cage member 30. Hollow detent member 45 is shown provided with a substantially cylindrical body portion 46 at its right-hand end and is provided with an enlarged outer end 47 at its left-hand end. Enlarged outer end 47 is provided with a plurality of axially extending grooves 48, corresponding with the number of apertures and ball members 38 and a like plurality of portions of larger diameter intermediate the said grooves, each of which is preceded, axially, by an inclined ramp portion 49 which, it will be noted, may be operative to engage ball members 38 in the course of operation of the invention. Detent member 45 is further biased toward the right end of the drawings by a suitable spring member 50 which is disposed intermediate a ring disposed in a suitable groove on shaft 41. As may be discerned by those skilled in the art, key member 42 and pin member 52, may each coact with their respective groove and slots in detent member 45 to allow limited axial reciprocation of detent member 45 while retaining rotary driving engagement with rotary solenoid shaft 41. A further snap ring 51 is shown disposed around cage member 30 adjacent center shoulder 23 of housing 15 to provide, where desired, a "feel" of operation for the operator as valve spool 11 is axially displaced intermediate the limits of operation associated with cage member 30 as determined by its center outwardly facing peripheral necked-down portion 34.

Figure 7:
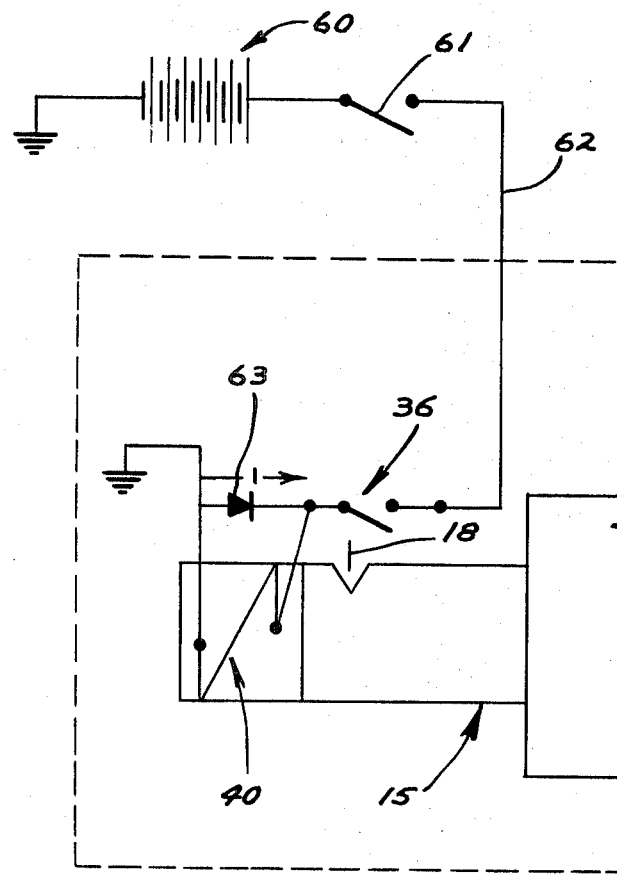
FIG. 7 is a diagrammatic, symbolic, schematic diagram of a hydraulic valve incorporating the principles of our invention and including an exemplary electrical schematic diagram for operation of a portion of the valve mechanism.

Referring specifically to FIG. 7 of the drawings, the rotary solenoid is indicated generally by reference character 40 and is shown to include, by diagrammatic representation, a coil winding which has a first terminal connected to ground and a second terminal connected to a battery 60 through normally open switch means 36, conductor 62 and switch means 61. The other terminal of battery 60 is connected to ground to complete the circuit and it may be noted that in common with conventional conservative practice, a diode 63 is connected in the proper polarity across the terminals of the coil winding contained in rotary solenoid 40 to allow of unimpeded collapse of the field upon the opening of switch means 36 or 61 to prevent damage to the remainder of the electrical circuitry associated therewith.

OPERATION

Figure 6:
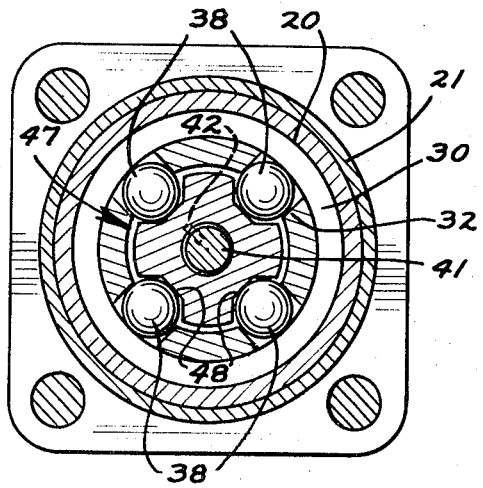
FIG. 6 is a sectional view of the apparatus shown in FIG. 5 at a different stage in the operation thereof.

In operation, reference may be had to FIG. 2 of the drawings which is illustrative of the embodiment of our invention associated with an open center or center-off valve in which a valve spool 11 may be in the position shown as centered according to the centering-spring arrangement, 13, associated therewith. Under such conditions, all of the elements are in the condition shown and rotary solenoid 40 would be deenergized and therefore detent member 45 would be in the position indicated on FIG. 6 of the drawings. It may also be noted that normally open switch 36 would be open as its actuator 37 and pin 18 would be in the position shown in FIG. 2 of the drawings.

Figure 4:
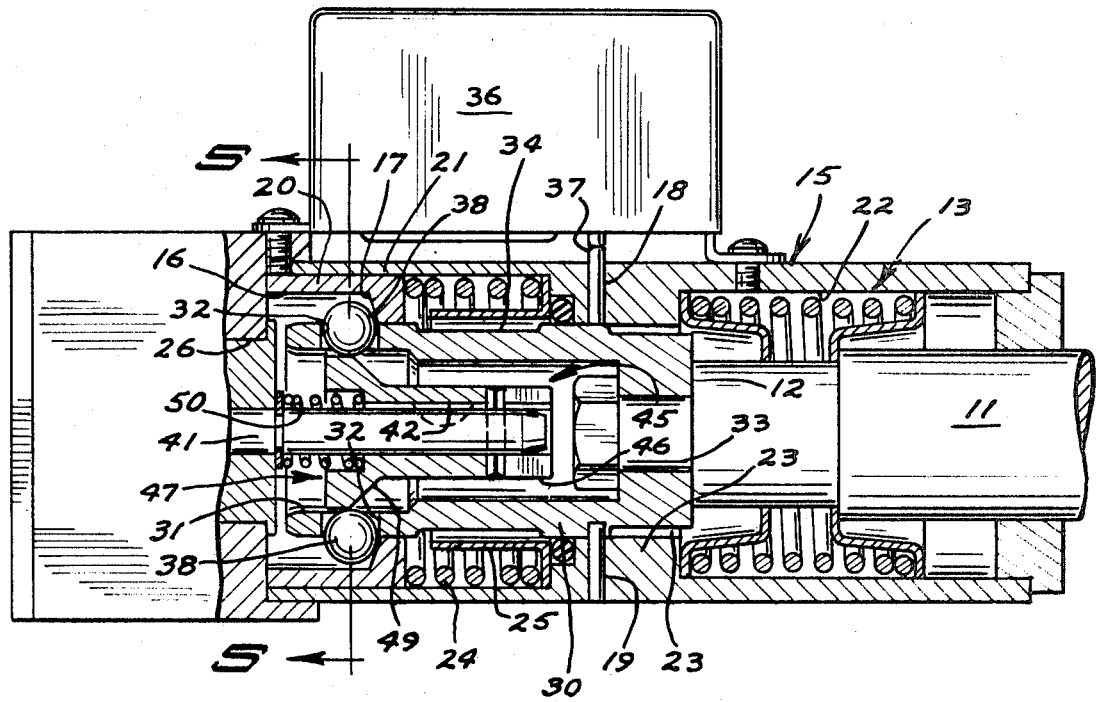
FIG. 4 is a like partial sectional view of the apparatus shown in FIG. 2 taken at a different stage in the operation thereof.
Figure 5:
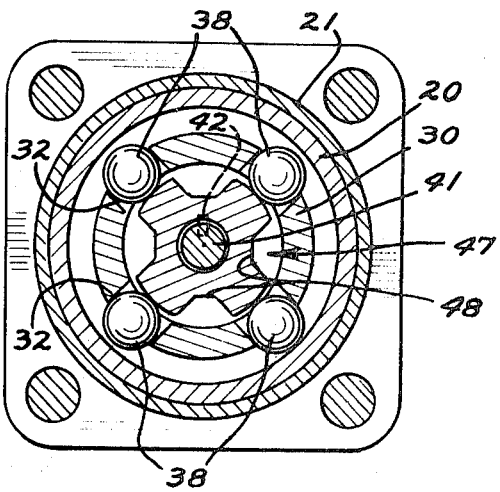
FIG. 5 is a sectional view of the apparatus shown in FIG. 4 taken along section line 5—5.

As valve spool 11 is moved toward the left on the drawings, cage member 30 and apertures 32 are also disposed toward the left as illustrated in FIG. 3 of the drawings so that ball members 38 may engage the ramp portions of the enlarged end of detent member 45. Detent member 45 is displaced toward the left for a distance until such time as the ramp portions 49 may force ball members 38 radially outwardly into the centrally enlarged portions 16 of collar member 20 and at such time, spring 50 may urge detent member 45 toward the right to effectively lock ball members 38 in place intermediate the outer periphery of the enlarged end 47 of detent member 45 and the enlarged inner portion of collar member 20 as shown, for example, on FIGS. 4 and 5 of the drawings.

It may be noted at this point that collar 20 and its associated spring 24 may be moved axially toward the right for some distance under manual overriding conditions as desired by the operator. However, it is preferable that the centering-spring arrangement 13 be of lesser power or strength than spring 24 so as to prevent undesired displacement of valve spool 11.

When it is desired to release valve spool 11 from the detented position above described, closing of switch 61 will serve to complete the electrical energization circuit for rotary solenoid 40 since switch 36 is already in its closed position through actuation by pin 18 in engagement with the outer periphery of cage member 30. A very low force is required to rotate detenting member 45 through its limited angular rotation of, in the illustrative example, approximately 45°. Upon such rotation, ball members 38 are free to move inwardly under the biasing of the inclined ramp portions 17 on collar 20 to allow return of valve spool 11 to its center or neutral position under the influence of centering-spring apparatus 13.

Referring now to FIGS, 8, 9, 10, 11, 12, 13 and 14 of the drawings, a further embodiment of a valve incorporating the principles of our invention is illustrated.

In the second embodiment, a valve body 70 is shown having a spool member 71 reciprocably slidably disposed therein which, in a center position, is intended to be disposed so that the illustrative valve body configuration is in neutral.

Spool 71 is shown having an outer left end 72 which is provided with adjacent radially outwardly opening grooves 73, 74 and 75. The right end of spool member 71 is adapted to be operated upon by suitable mechanism not shown to axially displace spool member 71 to provide suitable operation of the valve body in which it is disposed. Spool member 71 is also provided with appropriate and well-known centering apparatus 76 which may be operative to tend to bias spool member 71 in its center neutral position whereat groove 74 may normally be disposed adjacent to and substantially in registration with ball detent members 100 (to be described below).

A hollow housing 80 is attached to the left end of valve body 70 and has a generally cylindrical interior opening extending completely therethrough substantially coaxially of the left outer end 72 of valve spool 71. A hollow detent cage 81 is shown nonreciprocably mounted within the bore of hollow housing 80 and includes a radially outwardly extending shoulder portion 83 engaged with the interior wall of hollow housing 80 and adjacent a plurality (four) of radial apertures 82 which extend radially therethrough. Detent cage 81 is also provided with a substantially cylindrical hollow left end 84 which includes a grooved portion 85 for retaining a spring member 87 axially slidably disposed therearound. The left end of hollow housing 80 serves as a mounting for a solenoid 90 which includes a rotary solenoid operator (having a return spring not shown) 91 which serves to rotatably position an axially extending drive pin 92 which extends into a like slot or axial aperture 93 in the left end of hollow detent member 94. Hollow detent member 94 is shown having an outer cylindrical surface dimensioned to reciprocably and rotatably slide within hollow housing 80 and having an inner cylindrical surface adapted to reciprocably and rotatably slide upon the outer portion of spring 87. The interior right-hand end of hollow detent member 94 extends radially inwardly for a distance sufficiently to engage the outer left end cylindrical portion of hollow detent cage 81 so that it may be freely slidable thereupon but may also be engaged by the right end of spring 87 to tend to maintain a biasing force which will tend to move hollow detent member 94 toward the right as shown on the drawings. The right end of hollow detent member 94 is dimensioned and configured to provide a first member of inwardly inclined chamfered areas 97 which, upon engagement with ball detent members 100, tend to bias and force ball detent members 100 inwardly into engagement with valve spool 71 and the grooves 73, 74 and 75, disposed therein. The normal detenting position is thus represented by engagement of ball detent members 100, when in any one of the last-mentioned grooves, with these inwardly inclined chamfered services 97 on hollow detent member 94.

Hollow detent member 94 also includes a plurality of generally conical surfaces having a smaller radius at the outer periphery and a larger radius at the interior periphery which are disposed intermediate and adjacent to the inwardly inclined chamfered detenting areas. These intermediate areas may be referred to as having a compound angular configuration and are identified by reference characters 98, there being a number equal to the number of ball bearing detent members 100. Compound angular areas 98 are operative upon energization of rotary solenoid 90 and the consequent rotation of hollow detent member 94, to allow release, or unlocking, of ball detent members 100 and allow the valve spool 71 to be moved to a different position relative to valve body 70.

In operation, the apparatus may initially start from a position shown in FIG. 8 of the drawings. In this position, the orientation of the respective elements of the apparatus is as shown in FIGS. 10, and 11, namely the ball detent members 100 are securely disposed and held in groove 75 in valve spool 71 by virtue of the inwardly inclined portions 97 upon hollow detent member 94 under the biasing influence exerted by spring 87 disposed on the left end of hollow detent cage 81.

When it is desired to release spool 71 from a detented position, the exertion of a sufficient physical force on the right end of detent spool 71 may serve to cause movement of hollow detent member 94 to the left against the biasing force of spring 87 and allow radially outward movement of ball detent members 100 out of engagement with groove 75 to thereby release valve spool 71. Alternatively, and according to the principles of our invention, rotary solenoid 90 may be energized to drive hollow detent member 94 about its center axis for a predetermined number of angular degrees whereby compound angular areas 98 are disposed adjacent each of the ball detent members 100 as shown in FIG. 12 of the drawing. This allows the ball detent members 100 to move radially outwardly to a position such as is shown in FIG. 13 of the drawings to allow free movement of valve spool 71, in the illustrative embodiment, from groove 75 to "neutral" groove 74 whereat it is normally disposed by the centering mechanism 76 for valve spool 71. When the valve spool reaches this position, the rotational biasing force exerted by the spring (not shown) attached to the operator for rotary solenoid 90, tends to rotate member 94 in a direction to return to the position illustrated in FIG. 10 of the drawings. The biasing force exerted by the spring and the configuration of the compound angular areas 98 on the right end of hollow detent member 94 serves to exert an inward biasing force on ball detent members 100 and when they are substantially fully seated in an inward direction in any of the grooves 73, 74 and 75 on the left end of spool member 71, hollow detent member 94 may return to its initial locking position as illustrated in FIG. 11.

Having now described our invention in terms of "single-acting" and "double-acting" embodiments, it may now occur to those skilled in the art that our invention may be incorporated in other forms of valves or in more elaborate constructions.

Having now therefore fully illustrated and described our invention, what we claim to be new and desire to protect by Letters Patent is:

1. In apparatus of the class above described including a valve body and a valve spool reciprocably disposed therein, the combination comprising:
   a. a cylindrical housing mounted over one end of a valve spool for slidably receiving the same, said housing including a radially enlarged portion displaced axially outwardly of the end of said valve spool and including a shoulder portion at the end nearest to the end of said valve spool;
   b. a hollow cage member mounted on the end of said valve member, said cage member being open at its outer end, and including a plurality of radial apertures in proximity to said outer end;
   c. a like plurality of ball members radially, slidably disposed in said radial apertures;
   d. detenting means, slidably disposed in at least a portion of said cage member, said detenting means including means for radially outwardly biasing the ball members toward the radially enlarged portion of said housing upon outward displacement of said valve spool whereby said ball members engage the shoulder portion in said housing so that said valve spool is retained in said outward position.

2. The apparatus of claim 1 in which the shoulder portion of the cylindrical housing is slidably reciprocably mounted therein, and biasing means exert an outwardly directed force thereupon.

3. The apparatus of claim 1 in which the valve spool is operatively connected to means for biasing the same to a predetermined axial position.

4. The apparatus of claim 3 in which the detenting means includes a radially enlarged portion to engage and retain the ball members in a detented position and axially extending grooves intermediate the radially enlarged portions.

5. The apparatus of claim 1 in which the detenting means is operatively connected to a control means operative to rotate said detenting means intermediate said ball member engaging position and a further ball member releasing position.

6. The apparatus of claim 1 in which the detenting means includes a radially enlarged portion to engage and retain the ball members in a detented position and axially extending grooves intermediate the radially enlarged portions.

7. The apparatus of claim 4 in which the dententing means includes means axially biasing the same toward the valve spool.

8. The apparatus of claim 6 in which the detenting means includes means axially biasing the same toward the valve spool.

9. The apparatus of claim 8 in which the detenting means is operatively connected to a control means operative to rotate said detenting means intermediate said ball-member-engaging position and a further ball-member-releasing position.

10. The apparatus of claim 1 in which the shoulder portion of the cylindrical housing is outwardly inclined.

11. In apparatus of the class above described including a valve body and a valve actuator, the combination comprising:
   a. releasable valve actuator detenting means rotatably disposed on said valve body and in operative valve actuator engaging relationship to said valve actuator means whereby said actuator may be retained in at least one or more actuated positions; and
   b. rotary drive means operatively connected to said valve actuator detenting means for releasing an engaged valve actuator upon energization thereof to rotate said valve actuator detenting means.

12. The apparatus of claim 11 in which the valve actuator detenting means includes means operative to tend to return the movable detent means to operable relationship including a circumferentially symmetrical, radially, outwardly decreasing, conical surface and biasing means tending to rotatably return said valve actuator detenting means to a detenting position.

13. The apparatus of claim 11 in which the valve actuator engaging means includes a stationarily mounted detent holding means.

14. The apparatus of claim 13 in which the means for maintaining the detent means in operable relationship includes an outwardly inclined chamfered surface and an axially disposed biasing means.

15. The apparatus of claim 12 in which the detent holding means includes radially movable detent means operable to variably engage detent receiving means on the valve actuator.

16. The apparatus of claim 15 in which the valve actuator detenting means includes means operative to tend to return the movable detent means to operable relationship including a circumferentially symmetrical, radially, outwardly decreasing, conical surface and biasing means tending to rotatably return said valve actuator detenting means to a detenting position.

17. The apparatus of claim 15 in which the valve actuator detenting means includes at least two means for engaging the radially movable detent means to maintain said detent means in operative relationship or to tend to return the movable detent means to operable relationship.

18. The apparatus of claim 17 in which the valve actuator detenting means includes means operative to tend to return the movable detent means to operable relationship including a circumferentially symmetrical, radially, outwardly decreasing, conical surface and biasing means tending to rotatably return said valve actuator detenting means to a detenting position.

19. The apparatus of claim 17 in which the means for maintaining the detent means in operable relationship includes an outwardly inclined chamfered surface and an axially disposed biasing means.

20. The apparatus of claim 19 in which the valve actuator detenting means includes means operative to tend to return the movable detent means to operable relationship including a circumferentially symmetrical, radially, outwardly decreasing, conical surface and biasing means tending to rotatably return said valve actuator detenting means to a detenting position.

21. In apparatus of the class above described, the combination comprising:
   a. A valve body member;
   b. A valve actuator member;
   c. Detenting means on one of said members, said detenting means including means for releasably engaging the other of said members whereby said members may be retained in at least one or more actuated positions; and
   d. Rotary drive means on one of said members and operatively disposed to engage said detenting means, said drive means being operative in a first position to bias said detenting means into operative detenting disposition and operable in a second position to release said detenting means.

22. The apparatus of claim 21 in which the means for releasably engaging the other of said members includes a plurality of radially movable portions.

* * * * *